(12) United States Patent
Iwata et al.

(10) Patent No.: US 7,476,096 B2
(45) Date of Patent: Jan. 13, 2009

(54) SCREW EXTRUDER

(75) Inventors: Takuzo Iwata, Kobe (JP); Isao Ohiwa, Kobe (JP)

(73) Assignee: Sumitomo Rubber Industries Ltd., Kobe-shi (JP)

( * ) Notice: Subject to any disclaimer, the term of this patent is extended or adjusted under 35 U.S.C. 154(b) by 0 days.

(21) Appl. No.: 11/362,707

(22) Filed: Feb. 28, 2006

(65) Prior Publication Data

US 2006/0222727 A1    Oct. 5, 2006

(30) Foreign Application Priority Data

Apr. 5, 2005    (JP)    ............... 2005-108917

(51) Int. Cl.
*B29C 47/62* (2006.01)
*B29C 47/64* (2006.01)

(52) U.S. Cl. ............... 425/204; 366/80; 366/81; 366/90; 425/208

(58) Field of Classification Search ............... 425/207, 425/208, 204; 366/80, 81, 90
See application file for complete search history.

(56) References Cited

U.S. PATENT DOCUMENTS

| | | | | |
|---|---|---|---|---|
| 3,884,451 A | * | 5/1975 | Stenmark et al. | 366/90 |
| 3,946,998 A | * | 3/1976 | Menges et al. | 366/88 |
| 4,310,484 A | * | 1/1982 | Blakeslee, III | 425/208 |
| 4,629,326 A | * | 12/1986 | Huls | 366/80 |
| 4,629,327 A | * | 12/1986 | Capelle | 366/80 |
| 4,720,254 A | | 1/1988 | Wood | |
| 4,846,054 A | * | 7/1989 | Mange et al. | 99/495 |
| 5,304,054 A | * | 4/1994 | Meyer | 425/208 |
| 5,599,098 A | * | 2/1997 | Christie | 366/90 |
| 6,132,076 A | | 10/2000 | Jana et al. | |

FOREIGN PATENT DOCUMENTS

| | | |
|---|---|---|
| GB | 2 068 249 A | 8/1981 |
| JP | 58-89341 A | 5/1983 |

* cited by examiner

*Primary Examiner*—Robert B Davis
*Assistant Examiner*—Joseph Leyson
(74) *Attorney, Agent, or Firm*—Birch, Stewart, Kolasch & Birch, LLP

(57) ABSTRACT

A screw extruder comprises an extruder body (4) with a bore (4H), and a screw (5) rotatably disposed in the bore (4H). The screw (5) comprises a screw shaft (7) and two screw flights (8 and 9) disposed in the form of a double helix. The screw flight (9) is substantially continuous, but the screw flight (8) is provided with large interruptions (11) within which a plurality of additional flight pieces (13) are disposed to change the number of passages repeatedly. Mixing/kneading pins (15) protruding into the bore (4H) can be provided. Preferably, the paths (17) for the mixing/kneading pins (15) are positioned within the interruptions (11) and on the upstream side and downstream side of the additional flight pieces (13).

5 Claims, 7 Drawing Sheets

SCREW EXTRUDER

The present invention relates to an extruder for elastomeric materials, more particularly to a screw extruder having an improved flight structure capable of highly dispersive mixing and kneading of high-viscosity raw rubber materials.

Usually, in manufacturing a pneumatic tire, various strips of raw rubber materials are used.

Conventionally, such a strip is formed by extruding a raw rubber material. The raw rubber material is formed by mixing its ingredients, e.g. rubber materials, additives, vulcanizing agent, vulcanization accelerator and the like, and kneading the mixture in a drum. Thus, the mixture needs to be conveyed from the drum to the extruder. As a result, even if only several kinds of rubber compounds are used in making a tire, a large scale of production equipment is needed in order to prepare the raw rubber strips.

On the other hand, a screw extruder, which is provided with mixing pins protruding into the bore in which the screw is disposed, is known.

By using such extruder, there is a possibility that a raw rubber strip can be made directly from its ingredients, and the production efficiency is remarkably increased, and the production equipment can be downscaled.

It is however, very difficult for the mixing pins alone to make a mixture with a homogeneous distribution of the ingredients.

It is therefore, an object of the present invention to provide a screw extruder, by which effective or highly dispersive mixing and kneading of raw rubber materials are possible, and accordingly, it is also possible to extrude a homogeneous rubber material.

According to the present invention, a screw extruder comprises an extruder body with a bore, and a screw rotatably disposed in the bore, the screw comprising a screw shaft, and two screw flights disposed in the form of a double helix, wherein one of said two screw flights is provided with large interruptions, whereby the screw flight is divided by the interruptions and screw flight pieces are formed between the interruptions, and within each of the interruptions, a plurality of additional flight pieces which are substantially parallel with each other are disposed.

BRIEF DESCRIPTION OF THE DRAWINGS

An embodiment of the present invention will now be described in detain in conjunction with the accompanying drawings.

Figure 1:
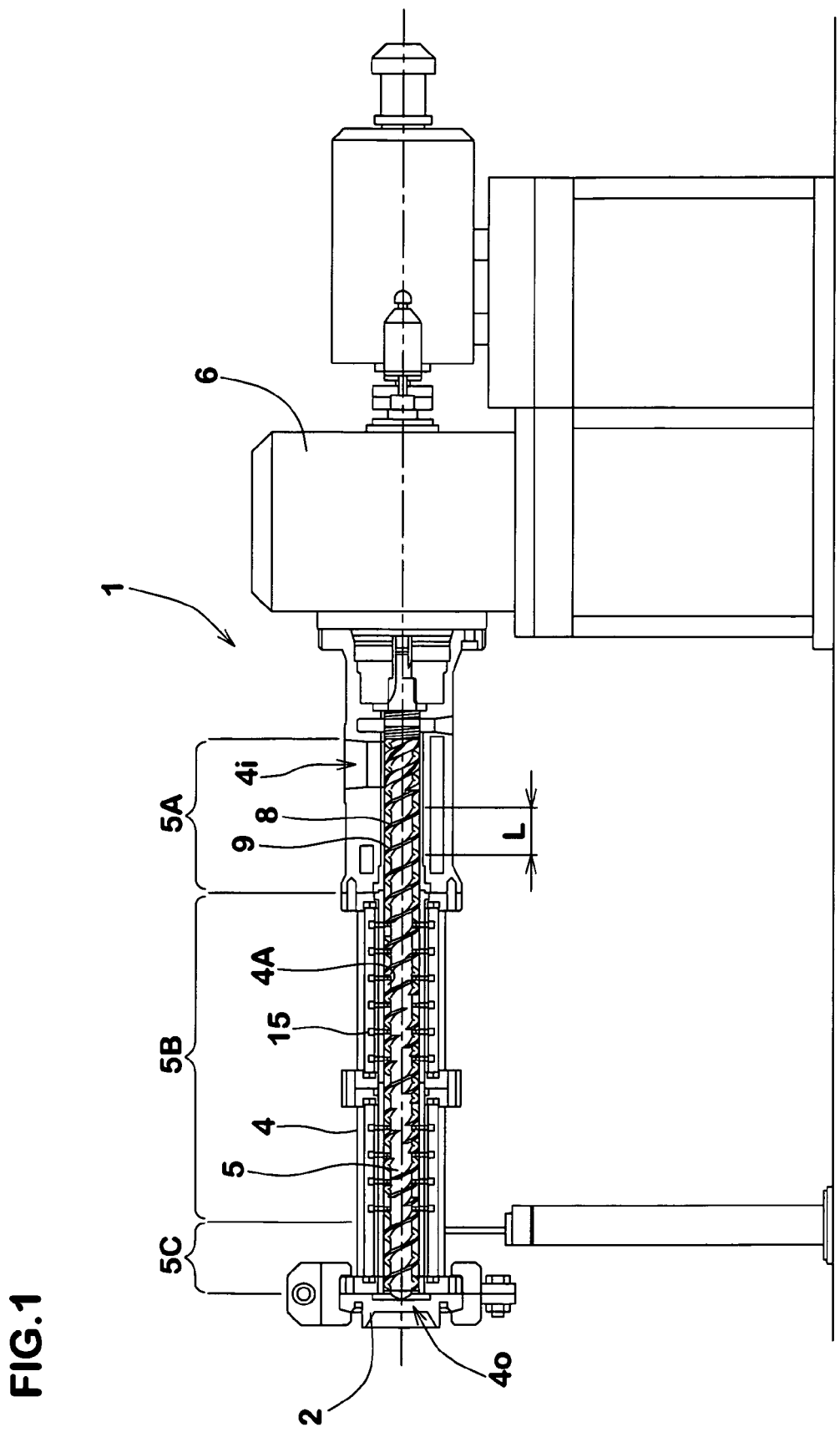
FIG. 1 shows an rubber extruder according to the present invention.

In the drawings, extruder 1 according to the present invention comprises:

an extruder body 4 which has a cylindrical bore 4H, an inlet 4i opening at the upstream end of the bore, and an outlet 4o opening at the downstream end of the bore;

an extruder head 2 attached to the extruder body 4 and including an extruding die associated with the outlet 4o, a screw 5 rotatably disposed in the bore 4H; and a driving unit 6 for rotating the screw 5 which comprises an electric motor, reduction gears, controller and the like.

The driving unit 6 is supported by a frame. The rear end and front end of the extruder body 4 are supported by the casing of the driving unit 6 and a stand, respectively. The rear end of the screw 5 is connected to the electric motor through the reduction gears. When power is applied to the motor, the screw 5 is rotated. Raw rubber materials, additives, chemicals and the like to be mixed and kneaded (hereinafter, the "rubber material") are introduced into the bore 4H via the inlet 4i.

As the screw 5 rotates, the rubber material is mixed and kneaded while being forced though a helical passage G towards the downstream end, and the mixed and kneaded material is extruded from the extruding die.

More specifically, the extruder 1 is used to make continuously a relatively thin raw rubber tape directly from its compounding ingredients—for example, butadiene rubber (55 phr), natural rubber (45 phr), carbon black (50 phr), oil (5 phr), vulcanization accelerator (0.7 phr), vulcanizing agent (1.5 phr) and various additives (11 phr). The diameter of the screw is 90 mm, the length of the screw 1440 mm, and the rotational speed of the screw is about 20 rpm, for example.

The extruder body 4 is provided with the following sections in this order:

a compressing section 5A to drag the rubber material introduced via the inlet 4i into the bore, and compress the rubber material to remove air, and pushing it downstream;

a mixing/kneading section 5B to mix and knead the rubber material while conveying downstream; and a stabilizing section 5C to make a steady flow of the mixed/kneaded rubber material in order to remove residual stress and strain from the extruded rubber and minimize the variation of the extrusion rate.

The screw 5 is composed of:

a screw shaft 7 concentric with the bore 4H; and two screw flights 8 and 9, namely, two helical metal threads disposed around the screw shaft 7 in the form of a double helix.

In this example, the double-helical flights 8 and 9 are provided along the substantially entire length of the screw 5 through the compressing section 5A to the stabilizing section 5C. But, it may be possible to provide the double-helical flights 8 and 9 partially, for example only in the mixing/kneading section 5B. In this case, in the remaining section for example 5A and 5C, a screw flight in the form of a single helix and/or screw flights in the form of a triple or more helix may be provided.

Furthermore, it may be possible to replace the above-mentioned partially or wholly provided two screw flights 8 and 9 with screw flights in the form of a triple or more helix.

In any case, the screw flights include a screw flight 9 being substantially continuous in each of the compressing, mixing/kneading and stabilizing sections 5A, 5B and 5C to define a main passage G. The remaining screw flight or flights, in this example a screw flight 8 is substantially continuous in each of the compressing and stabilizing sections 5A and 5C. But, in the mixing/kneading section 5B, the screw flight 8 is discontinuous because considerable interruptions 11 are provided.

Figure 5:
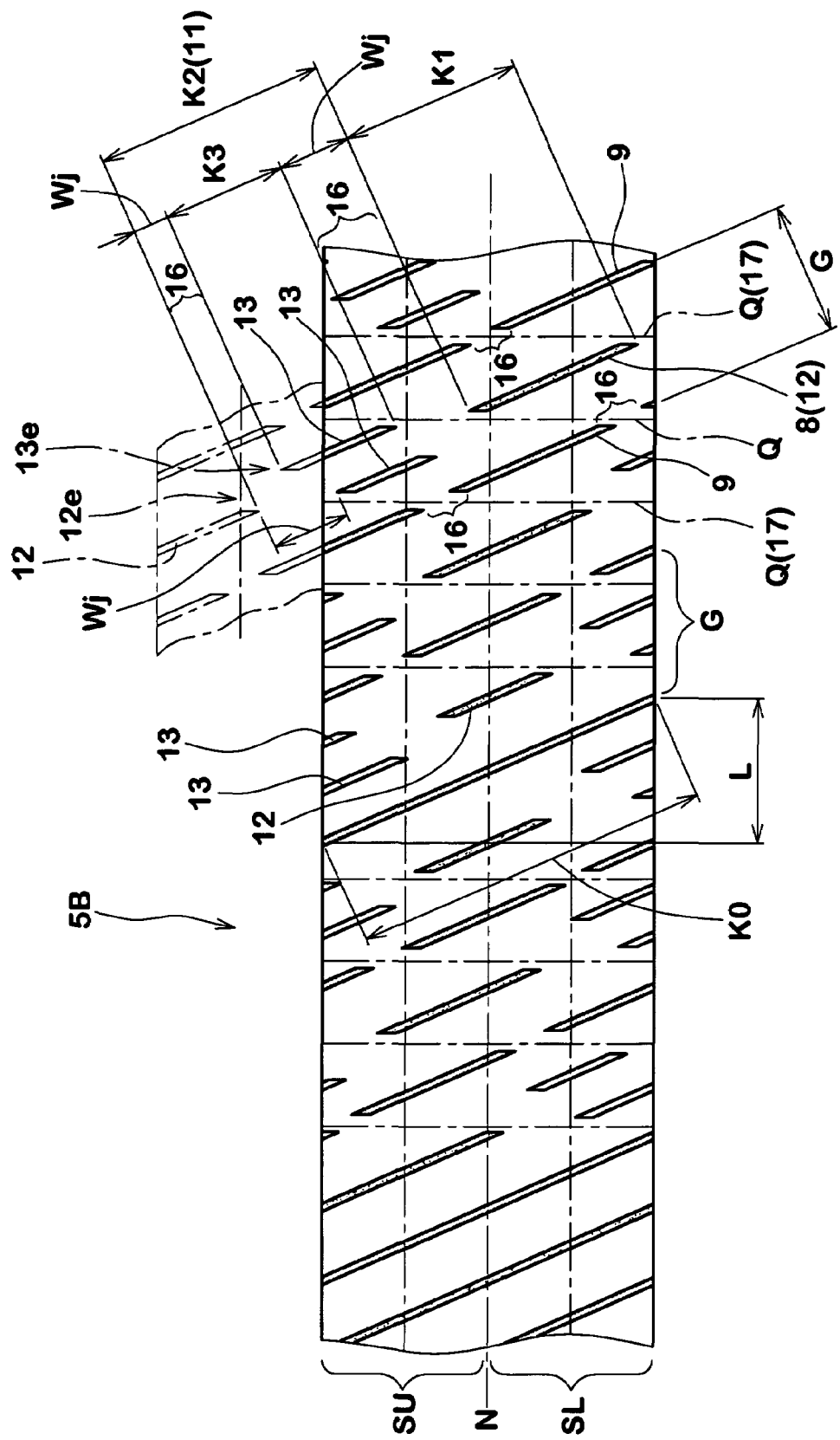
FIG. 5 is a view of the screw in the mixing/kneading section showing the screw flights in the form of a development.

In this example, optional mixing/kneading pins 15 are also provided in the mixing/kneading section 5B. Accordingly, clearances 16 through which the pins 15 can pass are formed on both of the screw flights 8 and 9. Therefore, the meaning of the term "substantially continuous" is such that if the clearances 16 are not provided, the flight is indeed continuous in the relevant sections, and even if the clearances 16 are provided, as the clearances 16 are small when compare with the interruptions 11, the flight can be regarded as being continuous in the relevant sections as shown in FIG. 3 and FIG. 5 and especially FIG. 6.

In the compressing section 5A and also stabilizing section 5C, in order to increase the pushing and suction of the rubber material and to stabilize the extrusion, the helical lead L of each of the screw flight 8, 9 is set in the range of from 1.0 to 1.4 times the diameter D of the screw 5 measured in the corresponding position. If less than 1.0 times, the suction and extrusion is liable to become insufficient. If more than 1.4 times, the variation of extrusion is liable to increase.

In this example, the helical lead L of each screw flight 8, 9 is substantially constant along the entire length of the screw 5 to uniformize the compression of the material over the entire length.

Figure 2:
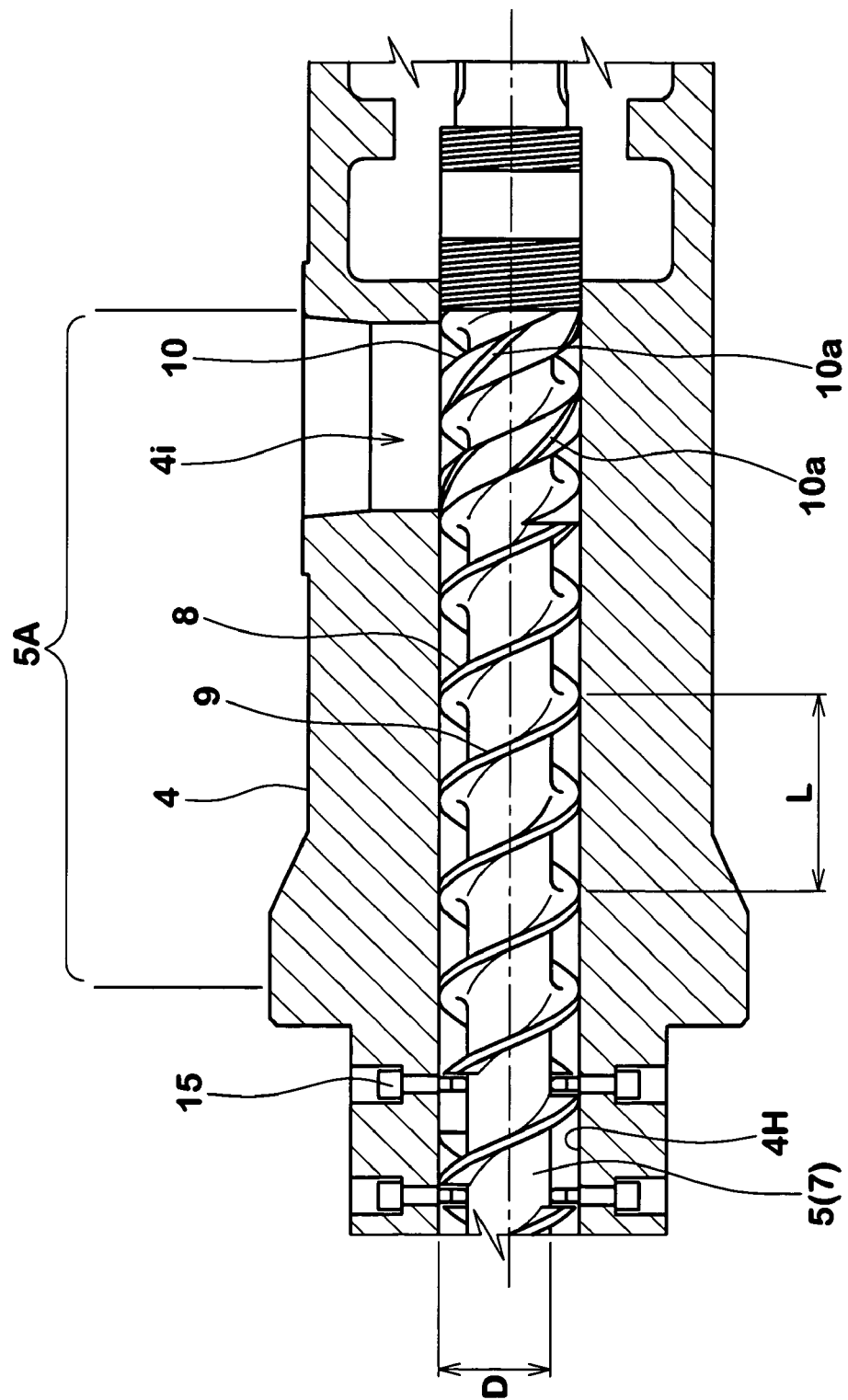
FIG. 2 is a longitudinal sectioned view through a compressing section of the extruder.
Figure 3:
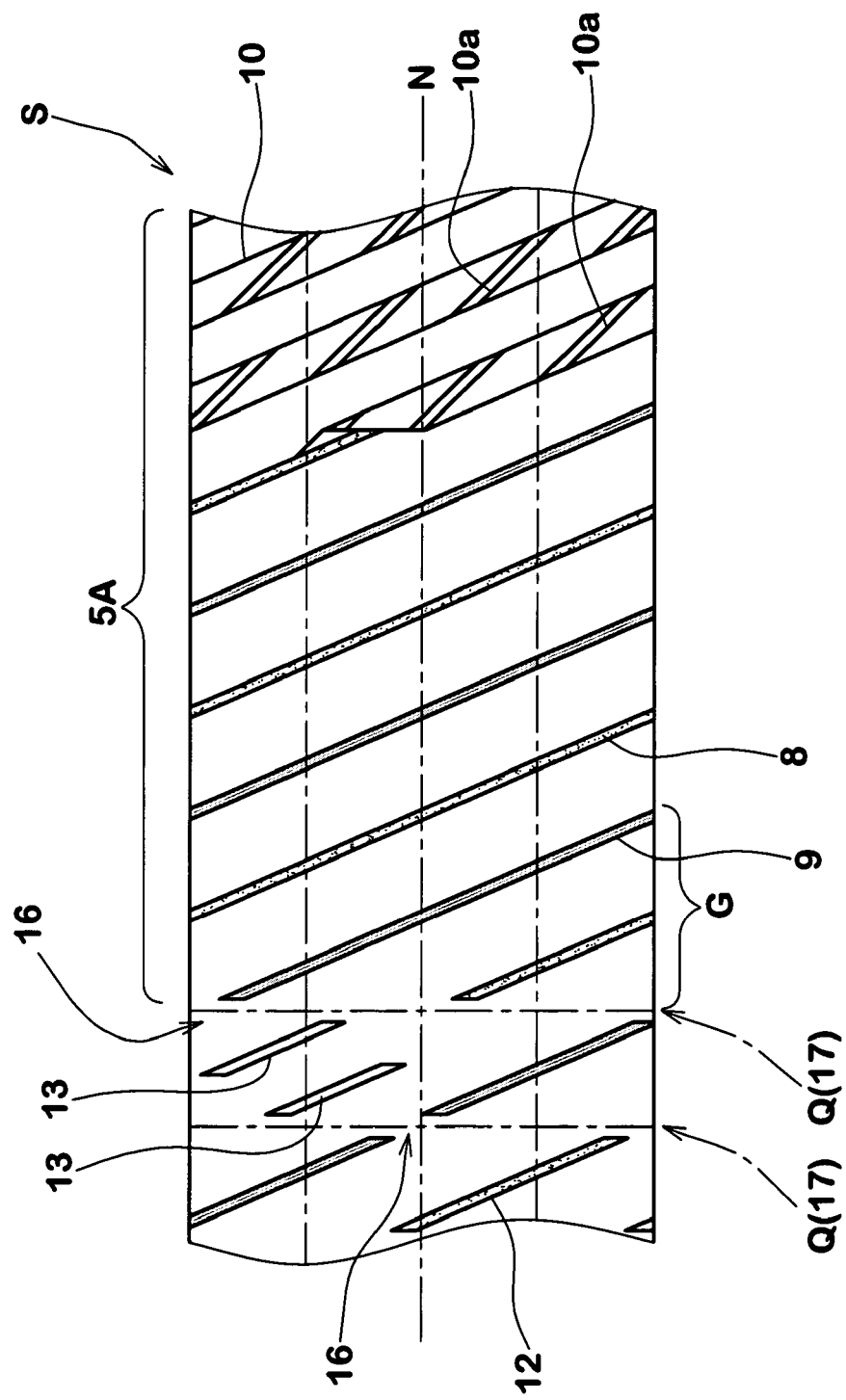
FIG. 3 is a view of the screw in the compressing section showing the screw flights in the form of a development.

In the compressing section 5A, each of the screw flights 8 and 9 is provided with a thickness-increased part 10, which part extends across the opening of the inlet 4i at the inner surface of the bore 4H as shown in FIG. 2 and FIG. 3. In FIG. 3, the cylindrical outer surface of the screw 5 is developed into a flat surface. Except for this part 10, the screw flights 8 and 9 have a substantially constant thickness.

The outer surface of the thickness-increased part 10 is provided with oblique grooves 10a at regular intervals with respect to its circumferential direction. The oblique grooves 10a extend across the entire thickness of the screw flight at an angle more than the helical lead angle of the screw flight. As a result, dragging of the materials into the bore, discharge of trapped air in the rubber material, and the durability against block of materials can be improved.

Further, a more important function of the grooves 10a is to crush or grind a large block of material put in the inlet 4i. Namely, a crushing section is provided in the initial stage of the compressing section 5A.

Figure 4:
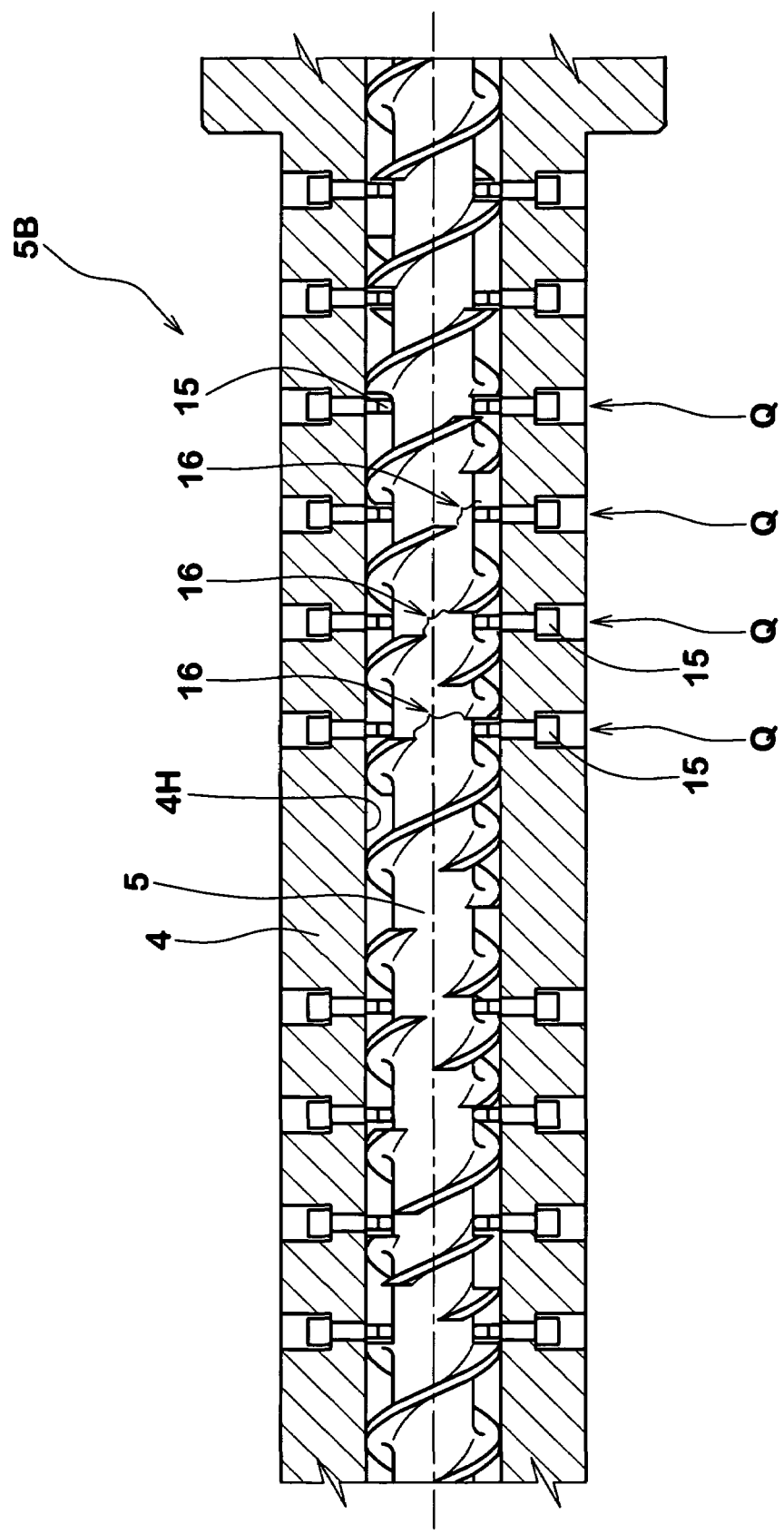
FIG. 4 is a longitudinal sectioned view through a mixing/kneading section of the extruder.

In the mixing/kneading section 5B, the screw flight 8 is provided with interruptions 11. Thus, the screw flight 8 in this section is made up of a plurality of screw flight pieces 12 disposed on a helical line alternately with the interruptions 11 as shown in FIG. 4 and FIG. 5. In FIG. 5, the cylindrical outer surface of the screw 5 is developed into a flat surface, and one half part SL under the center line N of the developed view is partially duplicated in a position above the other half part SL by using a chain line for easy understanding.

Figure 6:
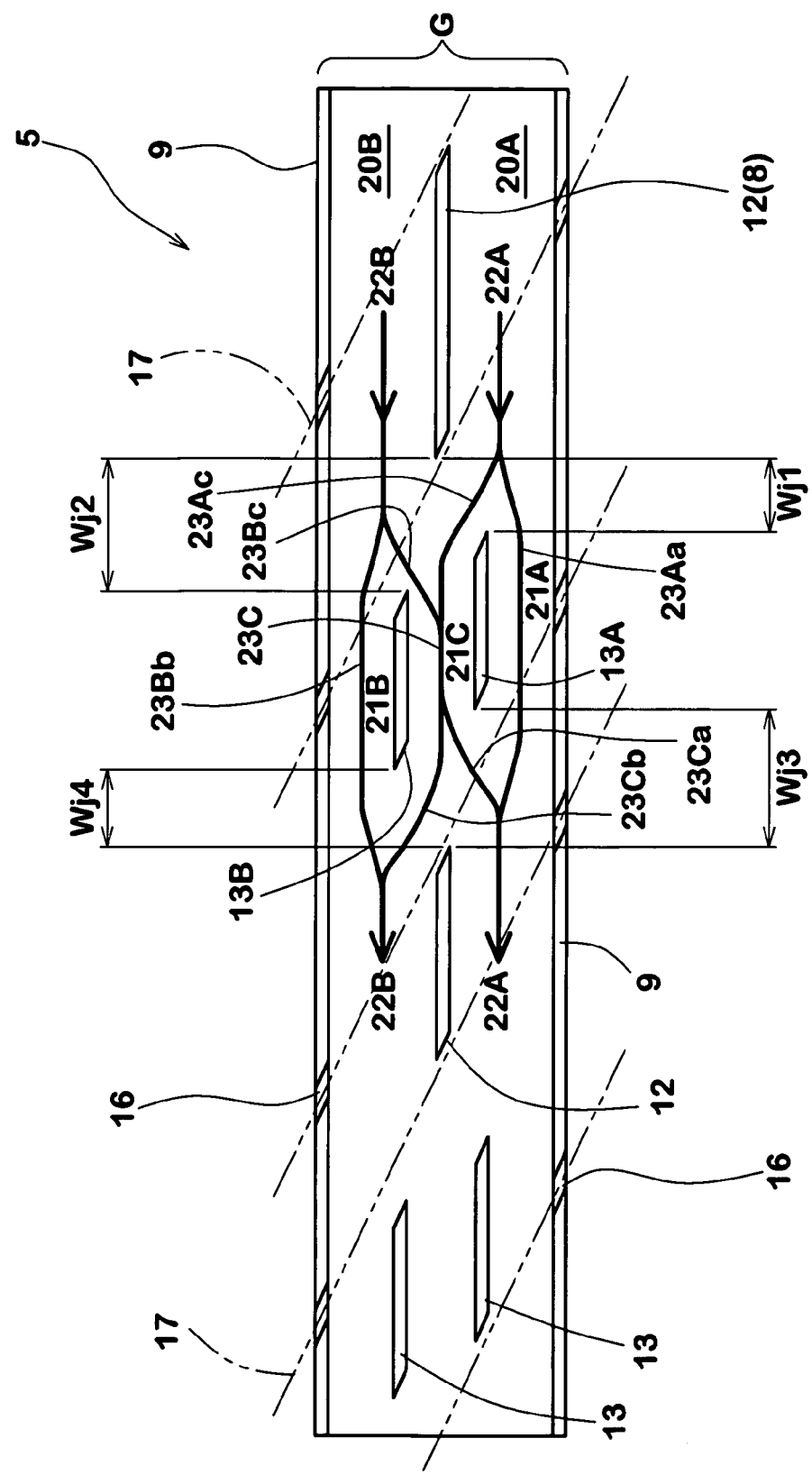
FIG. 6 shows the passage formed by the screw flights where the helical passage has been unrolled into a straight form.

Within each of the interruptions 11, two or more additional flight pieces 13 are disposed. The additional flight pieces 13 are arranged side by side and each extend in a direction substantially parallel to the screw flight 9 as shown in FIG. 5 and FIG. 6. In FIG. 6, the main passage G which is formed between the helical portions of the screw flight 9 and helically extends around the screw shaft 7 is unrolled into a straight form. The additional flight pieces 13 have a constant thickness substantially same as the above-mentioned thickness of the screw flights 8 and 9 excepting the thick part 10.

Preferably, an even number of flight pieces 13, in this example two flight pieces 13A and 13B are disposed side by side, and the flight pieces 13 divide equally the width of the main passage G. As a result, in the mixing/kneading section 5B, the number of subdivided passages through which the rubber material is forced downstream is repeatedly changed. In this example, the number is changed between 2 and 3.

The additional flight pieces 13 within each interruption 11 are the substantially same lengths K3 when measured parallel with the helical line at the outer surface. But, the positions of the additional flight pieces 13 in the helical direction are differed from each other as shown in FIG. 6 where the helical direction is illustrated as being straight.

Specifically, in each interruption 11, the flight piece 13 are gradually shifted in the helical direction such that:
certain distances Wj (Wj1 and Wj2) are provided between the downstream end 12e of a screw flight piece 12 and the upstream ends 13e of the flight pieces 13;
certain distances Wj (Wj3 and Wj4) are provided between the downstream ends 13e of the flight pieces 13 and the upstream end 12e of a screw flight piece 12; and
the distances Wj on the same side of the flight pieces 13 are differed from each other, namely (Wj1 not equal to Wj2), (Wj3 not equal to Wj4).

As a result, the occurrence of turbulent diffusion and kneading can be promoted. If the distances Wj is too short or too long, however, such effects can not be obtained. Therefore, it is preferable that the distance Wj is not less than 40 mm, preferably more than 50 mm, but not more than 90 mm, preferably less than 80 mm.

Further, if the lengths K1 of the screw flight pieces 12 and/or the lengths K2 of the interruptions 11 are too long, the number of repetition of the splitting/merging explained below becomes insufficient. Therefore, the lengths K1 of the screw flight pieces 12 measured along the helical line at the outer surface are preferably set in the range of from 0.4 to 0.6 times the length K0 corresponding to one helical lead L measured along the helical line at the outer surface. The lengths K2 of the interruptions 11 measured along the helical line at the outer surface are preferably less than the length K0 but not less than the length K1.

In this example, as mentioned above, a plurality of mixing/kneading pins 15 are detachably provided in the mixing/kneading section 5B. As shown in FIG. 4, the mixing/kneading pins 15 are disposed in a plurality of positions Q of the extruder body 4 at intervals along the axial direction of the screw 5.

Figure 7:
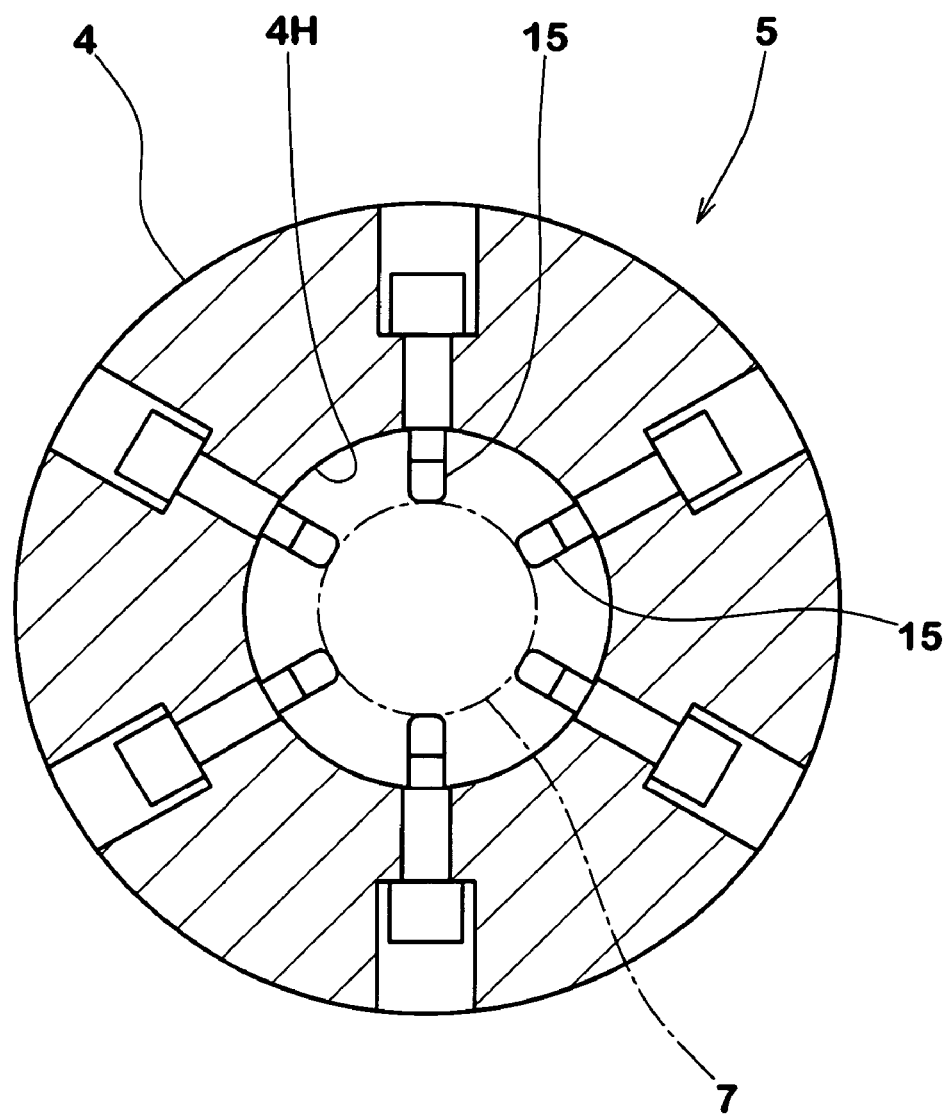
FIG. 7 is a cross sectional view of the extruder body showing an arrangement of mixing/kneading pins.

In each of the position Q, as shown in FIG. 7, a plurality of mixing/kneading pins 15 (in this example, six pins) are arranged equiangularly around the rotational axis of the screw, and each pin 15 protrudes from the inner surface of the bore 4H towards the center of the bore 4H. As the mixing/kneading pins 15 reach to near the screw shaft 7, the screw flights have to be provided with clearances having a width and depth large enough for the passing of the mixing/kneading pins 15. In the case of the screw flight 9, clearances 16 having a shape slightly larger than that of the pin are provided. In the case of the screw flight 8, on the other hand, the interruptions 11 are used as such clearances. In other words, no clearance is formed on the screw flight pieces 12 and 13. Therefor, in each position Q, a path 17 for the six pins is formed. In relation to the passages G, the path 17 extends obliquely, and during rotating, the pins 15 move in the oblique path 17 from the upstream side to the downstream side.

In this example, each of the paths 17 is positioned within one of the interruptions 11. Within one interruption 11, two paths 17 are formed on the upstream side and downstream side of the flight pieces 13, respectively, namely, one path between the downstream end 12e of a screw flight piece 12 and the upstream ends 13e of the additional flight pieces 13; and the other path between the downstream ends 13e of the additional flight pieces 13 and the upstream end 12e of a screw flight piece 12.

Therefore, in the case of FIG. 6, for example, a flow 22A of rubber material in the passage 20A is split by the flight piece 13A into two split flows 23Aa and 23Ac which mainly flow in the passages 21A and passage 21C, respectively. On the other hand, a flow 22B in the passage 20B is split by the flight piece 13B into two split flows 23Bb and 23Bc which mainly flow in the passages 21B and passage 21C, respectively. Accordingly, in the central passage 21C, the split flows 23Ac and 23Bc merge into a single flow 23C. Further, as the flows 22A and 22B are traversed by the six pins 15 per one revolution, a part of the flow 22A is transferred to the split flow 23Bb.

Then, the interflow 23C is again split by the flight piece 12 into two split flows 23Ca and 23Cb. The split flow 23Ca and flow 23Aa again merge into a single flow 22A. The split flow 23Cb and flow 23Bb again merge into a single flow 22B. As the flows 23Bb, 23C and 23Aa are traversed by the sic pins 15 in the same way as above, a part of the flow 23Aa is transferred to the flow 22B.

Such processes are repeated in the mixing/kneading section 5B. Therefore, effective dispersive mixing as well as effective kneading is possible.

If the number of repetition is too small, however, it is difficult to obtain such advantages. Therefore, in this example, the above-explained processes are repeated five times. In other words, the number of the interruptions 11 is five, and accordingly, the number of the positions Q or paths 17 which is twice as the interruptions 11 is ten. It is preferable that the number of the interruptions 11 is at least three, but at most ten, preferably less than eight.

If the number of the interruptions 11 is small, for example three, it is possible to achieve the dispersive mixing by inclining the additional flight pieces 13 at a small angle of at most about 10 degrees with respect to the direction of the passage G although the additional flight pieces 13 in this example are substantially parallel with the direction of the passage G. For dispersing purpose, it is also possible to set the angle between the opposite walls of the additional flight pieces 13 or between the opposite walls of the additional flight pieces 13 and the flight 9 at a small positive value of at most about 10 degrees although in this example such angle is substantially zero or less that 5 degrees.

Incidentally, the extruder 1 is provided with sensors for the pressure and temperature of the rubber material in the bore 4H. Such sensors are disposed in the mixing/kneading section 5B at least. The sensors are associated with the controller, and the controller controls the motor to reduce the rotational speed of the screw if the temperature becomes too high, and to change the rotational speed to make the pressure constant and so forth.

As described above, in the extruder 1 according to the present invention, a helical passage G formed by the substantial continuous flight 9 is subdivided in its widthwise direction by the flight 8. In the mixing/kneading section 5B, the number of the subdivided passages 20A, 20B, 21A, 21B and 21C is changed repeatedly along the helical passage. In the above example, a section having two passages 20A and 20B and a section having three passages 21A, 21B and 21C are alternately formed.

Therefore, the flow of rubber material is repeatedly subjected to splitting and merging. Due to the difference between the flow speeds near and away from the wall surface, turbulent diffusion is caused and the rubber material is kneaded. Further, the paths 17 for the mixing/kneading pins 15 are provided between the sections having the different numbers of passages. Therefore, transfer of the rubber material between the split flows is promoted. Furthermore, by the mixing pins, the rubber material is kneaded and the dispersive mixing is promoted due to the agitation by the mixing pins.

The invention claimed is:

1. A screw extruder comprising an extruder body (4) with a bore (4H), and a screw (5) rotatably disposed in the bore (4H), the screw (5) comprising a screw shaft (7), and two screw flights (8 and 9) disposed in the form of a double helix, wherein one of said two screw flights (9) forms a main passage (G) between the helical portions of the one screw flight (9), the main passage (G) extending helically around the screw shaft (7), the other of said two screw flights (8) is provided with large interruptions (11), whereby the other screw flight (8) is divided by the interruptions (11) and screw flight pieces (12) are formed between the interruptions (11), when the helical main passage (G) is unrolled into a straight form, the one screw flight (9) extends in a straight line, and the screw flight pieces (12) of the other screw flight (8) are arranged in a straight line, within each of the interruptions (11), two additional flight pieces (13A and 13B) which are substantially parallel with each other are disposed, and each of the two additional flight pieces (13A and 13B) is spaced apart from each of the two adjacent screw flight pieces (12) by a positive distance (WJ1, WJ2, WJ3, WJ4) in the longitudinal direction of the main passage (G), wherein the distance (WJ1) between one additional flight piece (13A) and one of the two adjacent flight pieces (12) is smaller than the distance (WJ2) between the other additional flight piece (13B) and the same flight piece (12); and the distance (WJ3) between the additional one flight piece (13A) and the other of the two adjacent flight pieces (12) is larger than the distance (WJ4) between the other additional flight piece (13B) and the same flight piece (12), and said extruder body (4) is provided with mixing/kneading pins (15) protruding into the bore (4H), wherein paths (17) for the mixing/kneading pins (15) are provided between the additional flight pieces (13A and 13B) and the screw flight pieces (12) so that each of the interruptions (11) forms two of the paths (17) on the upstream side and downstream side of the additional flight pieces (13A and 13B); and the one screw flight (9) is provided with clearances (16) to form the paths (17) for the mixing/kneading pins (15), wherein the clearances (16) have a shape slightly larger than that of the respective pins (15) enabling the passing of the mixing/kneading pins (15) so that each of the clearances (16) forms one of the paths (17), and the one screw flight (9) has no interruption except for the clearances (16).

2. The screw extruder according to claim 1, wherein each of the screw flights (8, 9) has a constant helical lead (L) of from 1.0 to 1.4 times a diameter (D) of the screw (5).

3. The screw extruder according to claim 1, wherein
the extruder body (4) is provided with an inlet (4i) having an opening to the bore (4H), the screw flights (8 and 9) are each provided with an increased-thickness part (10) extending across said opening of the inlet (4*i*), the outer surface of the thickness-increased part (10) is provided with oblique grooves (10*a*) at intervals in the circumferential direction of the screw (5), and the oblique grooves (10*a*) extend across the entire thickness of the increased-thickness part (10).

4. The screw extruder according to claim 1, wherein said positive distance (WJ1, WJ2, WJ3, WJ4) is not less than 40 mm and not more than 90 mm.

5. The screw extruder according to claim 2, wherein the length (K1) of each said screw flight piece (12) measured along the helical line at the outer surface thereof is 0.4 to 0.6 times the length (K0), corresponding to one helical lead (L), measured along said helical line, and the length (K2) of each said interruption (11) measured along the helical line is less than the length (K0) but not less than the length (K1).

* * * * *